United States Patent
McCorkendale et al.

(10) Patent No.: US 7,472,418 B1
(45) Date of Patent: Dec. 30, 2008

(54) DETECTION AND BLOCKING OF MALICIOUS CODE

(75) Inventors: Bruce McCorkendale, Manhattan Beach, CA (US); William E. Sobel, Stevenson Ranch, CA (US)

(73) Assignee: Symantec Corporation, Cuptertino, CA (US)

( * ) Notice: Subject to any disclaimer, the term of this patent is extended or adjusted under 35 U.S.C. 154(b) by 874 days.

(21) Appl. No.: 10/643,564

(22) Filed: Aug. 18, 2003

(51) Int. Cl.
G06F 11/00 (2006.01)
G06F 12/14 (2006.01)
G06F 12/16 (2006.01)
G06F 15/18 (2006.01)
G08B 23/00 (2006.01)

(52) U.S. Cl. ...................................... 726/24
(58) Field of Classification Search ................. None
See application file for complete search history.

(56) References Cited

U.S. PATENT DOCUMENTS

| | | | |
|---|---|---|---|
| 6,925,572 B1 * | 8/2005 | Amit et al. ............ | 726/15 |
| 7,080,408 B1 * | 7/2006 | Pak et al. .............. | 726/24 |
| 2002/0032871 A1 * | 3/2002 | Malan et al. ........... | 713/201 |
| 2003/0074578 A1 * | 4/2003 | Ford et al. ............. | 713/200 |
| 2003/0101353 A1 * | 5/2003 | Tarquini et al. ........ | 713/200 |
| 2003/0154255 A1 * | 8/2003 | Platte et al. ........... | 709/206 |
| 2004/0111531 A1 * | 6/2004 | Staniford et al. ....... | 709/246 |
| 2004/0250124 A1 * | 12/2004 | Chesla et al. ........... | 713/201 |
| 2006/0212572 A1 * | 9/2006 | Afek et al. ............. | 709/225 |

FOREIGN PATENT DOCUMENTS

GB  WO 0219069 A2 * 3/2002

OTHER PUBLICATIONS

Hoepers et al., "Honeynets Applied to the CSIRT Scenario." Jun. 2003. Brazillian Honeynet Project, pp. 2-7.*
Williamson, Matthew M., "Throttling Viruses: Restricting propagation to defeat malicious mobile code", Hewlett-Packard Company, unnumbered abstract page and pp. 1-6 [online]. Retrieved on Sep. 2, 2003. Retrieved from the Internet:<URL:http://www.hpl.hp.com/techreports/2002/HPL-2002-172.pdf>.
Bennett, Charles, Li, M. and Ma, B., "Linking Chain Letters", pp. 1-7 [online]. Retrieved on Sep. 2, 2003. Retrieved from the Internet: <URL:http://www.math.uwaterloo.ca/~mli/chain9.ps>.
Bennett, Charles H., Li, M. and Ma, B., "Chain Letters & Evolutionary Histories", Scientific American, Jun. 2003, pp. 76-81.

* cited by examiner

*Primary Examiner*—Emmanuel L Moise
*Assistant Examiner*—Nadia Khoshnoodi
(74) *Attorney, Agent, or Firm*—Gunnison, McKay & Hodgson, L.L.P.; Serge J. Hodgson

(57) ABSTRACT

Inbound and outbound traffic on a computer system are intercepted and compared to determine if the presence of malicious code is indicated. Outbound traffic that is sufficiently similar to recently received inbound traffic is indicative of the presence of malicious code. In some embodiments, if the presence of malicious code is indicated, the user, as well as other individuals or systems, are notified of the detection. In some embodiments, if desired, protective actions are initiated to hinder or block the propagation of the malicious code from the host computer system to other computer systems, as well as to remove or inactivate the malicious code on the host computer system.

17 Claims, 7 Drawing Sheets

DETECTION AND BLOCKING OF MALICIOUS CODE

BACKGROUND OF THE INVENTION

1. Field of the Invention

The present invention relates to the protection of computer systems. More particularly, the present invention relates to detection of malicious code, such as network worms.

2. Description of the Related Art

More recently developed computer viruses, such as the CodeRed and Nimda worms, exploit vulnerabilities of a host computer system and propagate from the host computer system to other computer systems at a very fast rate. Due to the fast propagating nature of these computer viruses, detection and prevention measures are typically developed and implemented after the computer virus has infected and damaged large numbers of computer systems.

SUMMARY OF THE INVENTION

In accordance with the present invention, inbound traffic to and outbound traffic from a host computer system are intercepted and compared to determine if malicious code is detected on the host computer system. In one embodiment, outbound traffic that is sufficiently similar to recently received inbound traffic is indicative of a malicious code detection. If malicious code is detected, a user of the host computer system, and, optionally, other individuals or systems, are notified of the detection. In some embodiments, if desired, protective actions are initiated to hinder or block the propagation of the malicious code from the host computer system to other computer systems, as well as to remove or inactivate the malicious code on the host computer system.

Embodiments in accordance with the present invention are best understood by reference to the following detailed description when read in conjunction with the accompanying drawings.

BRIEF DESCRIPTION OF THE DRAWINGS

Common reference numerals are used throughout the drawings and detailed description to indicate like elements.

DETAILED DESCRIPTION

Figure 1:
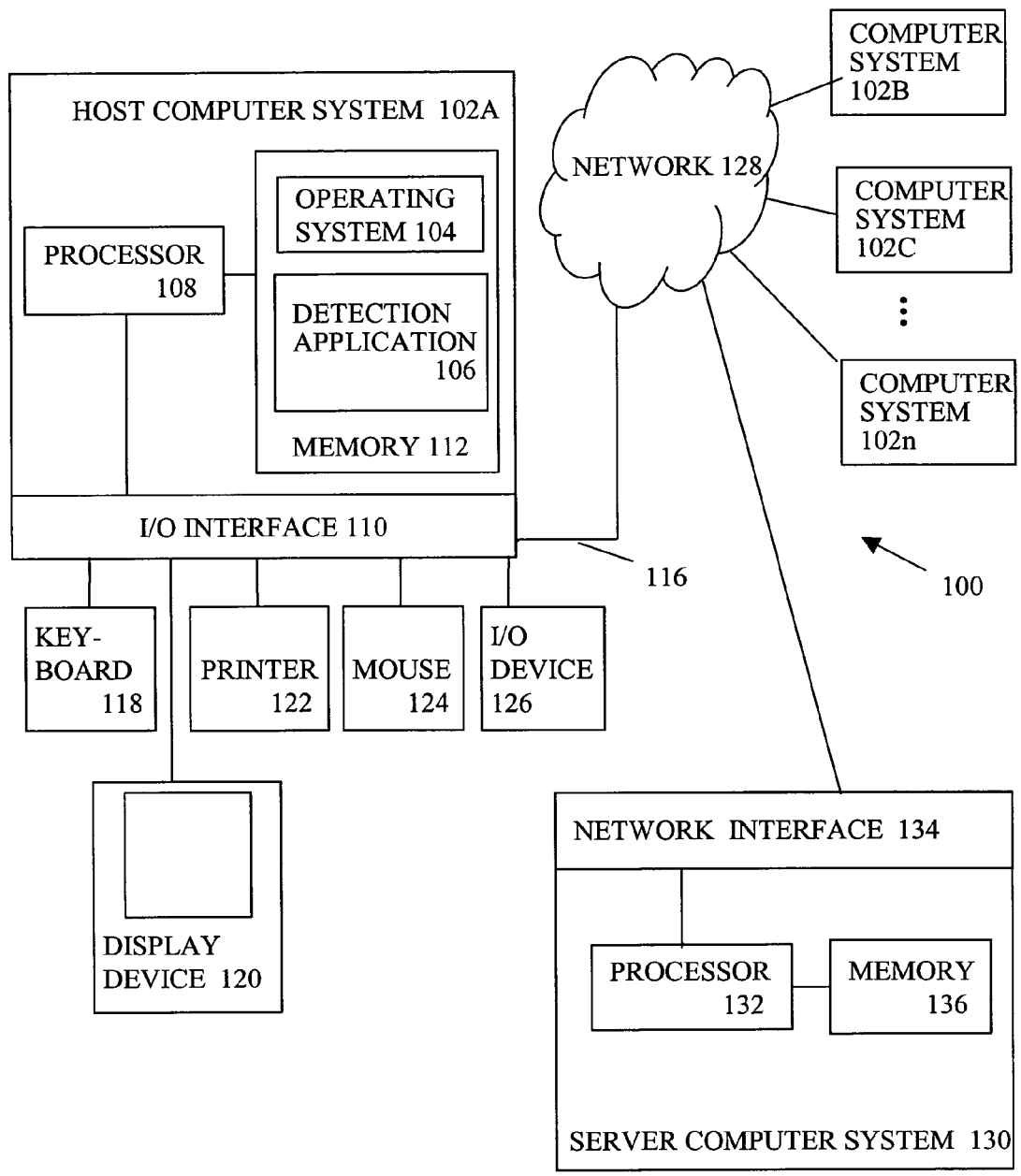
FIG. 1 illustrates a diagram of a client-server system that includes a detection application executing on a host computer system in accordance with one embodiment of the present invention.

In accordance with one embodiment of the present invention, inbound traffic on a host computer system is compared to outbound traffic on the host computer system to determine if malicious code is detected on the host computer system. If malicious code is detected, a user of the host computer system, as well as other individuals or systems, such as intrusion detection systems (IDS), are notified of the detection. If desired, protective actions are initiated to hinder or block the propagation of the malicious code from the host computer system to other computer systems, as well as to remove or inactivate the malicious code on the host computer system.

Herein, malicious code is defined as any computer program, module, set of modules, or code (including script) that enters a computer system without an authorized user's knowledge and/or without an authorized user's consent. Embodiments in accordance with the present invention detect features of network traffic that are unique to some malicious code, such as network worms, and are unlikely to occur during the course of non-worm infected network traffic.

For example, generally, there are two basic steps in the spread of a network worm: 1) gaining entry to a target host computer system, e.g., breaking in; and then, 2) infecting new host computer systems, e.g., spreading. Network worms, or simply worms, gain entry to a target host computer system by exploitation of a vulnerability, through, for example, buffer or heap overflows. Once the worm has compromised a target host computer system, the worm then selects new targets and spreads to them.

From the perspective of a target host computer system, the two step process of the worm's lifecycle has a distinct network signature. In the process of breaking in to a target host computer system, the target host computer system receives inbound traffic, for example, a request, containing the worm. In the process of spreading to new targets, outbound traffic nearly identical to the received inbound traffic is sent out repeatedly from the target host computer system. Usually, the inbound and the outbound worm traffic occur on the same port.

In most cases, the worm lifecycle is very short, so an additional characteristic of a worm outbreak is a short time period between the receipt of the worm traffic as received inbound traffic and its subsequent, repeated transmission, or sending, as outbound traffic. These described characteristics of the worm's lifecycle network signature are unlikely to occur during the course of non-worm network traffic.

In one embodiment in accordance with the present invention, outbound traffic that is sufficiently similar to recently received inbound traffic is used to determine whether malicious code has infected the host computer system. In one embodiment, a similarity comparison technique, such as a similarity comparison function, is used to compare the outbound traffic to the inbound traffic. In one embodiment, similarities that meet a specified threshold value are determined to indicate detection of malicious code.

In some embodiments, additional actions taken by a host computer system when infected by malicious code are used in making a determination whether malicious code is detected or to lower the impact of the determination process on the host computer system. For example, in computer systems that typically transmit traffic to ports different from ports that traffic is received from, transmission of outbound traffic that is sufficiently similar to recently received inbound traffic on the same port serves as an indication of malicious code. Further, in some embodiments, outbound traffic that does not correlate to a prior name resolution, such as a Domain Name System (DNS) name lookup, on the host computer system serves as an indication of malicious code. Conversely, outbound traffic that correlates to a prior name resolution on the host computer system optionally serves as an indication of non-malicious code and is excluded from a comparison process to determine if malicious code is detected, thus lowering the impact of the detection process on the host computer system.

FIG. 1 illustrates a diagram of a client-server system 100 that includes a detection application 106 executing on a host computer system 102A in accordance with one embodiment of the present invention. In one embodiment, host computer system 102A is a stand-alone computer system, such as a personal computer or workstation, as illustrated in FIG. 1 by host computer system 102A. In other embodiments, host computer system 102A is configured as part of client-server system 100, also illustrated in FIG. 1, in which host computer system 102A interacts with a server computer system 130 via a network 128, such as the Internet.

Detection application 106 is described herein as executed on host computer system 102A, e.g., a first computer system. However, in light of this disclosure, those of skill in the art can understand that the description is applicable to client-server system 100 and computer systems 102B-102n, interacting simultaneously or serially with server computer system 130, e.g., a second computer system.

Host computer system 102A, sometimes called a client or user device, typically further includes a processor 108, an input/output (I/O) interface 110, an operating system 104, and a memory 112. In one embodiment, memory 112 includes a main memory, as well as any supplemental memories, and includes executable areas, data storage areas, and any memory areas needed by host computer system 102A (including operating system 104).

Host computer system 102A may additionally include: standard input devices, such as a keyboard 118 and a mouse 124; standard output devices, such as a printer 122 and a display 120; as well as one or more standard input/output (I/O) devices 126, such as a compact disk (CD) or DVD drive, floppy disk drive, or other digital or waveform port for inputting data to and/or outputting data from host computer system 102A. As illustrated in FIG. 1, host computer system 102A sends and/or receives data to/from network 128 via at least one connection 116. In which case I/O interface 110 also includes a network interface, such as a network interface card (NIC).

In some embodiments, connection 116 includes one or more logical ports, also termed herein simply ports. For example, in transmission control protocol/internet protocol (TCP/IP), conventionally, up to 65,535 ports are assignable to a single IP address. Generally, a port number identifies the type of port. For example, currently, port 80 is a hypertext transfer protocol (HTTP) port. TCP/IP and logical ports are well-known to those of skill in the art and are not further described herein.

Data, such as packets, bytes, or bits, received on host computer system 102 from an external source is termed inbound traffic. For example, in TCP/IP, data received at host computer system 102A from network 128 from a source port over connection 116 is inbound traffic.

Data, such as packets, bytes, or bits, for transmission, e.g., sending, from host computer system 102 to an external destination is termed outbound traffic. For example, in TCP/IP, data for transmission to a destination port over connection 116 is outbound traffic. In one embodiment, the destination port is of a destination address.

In one embodiment, detection application 106 is loaded into memory 112 of host computer system 102A via an I/O device 126, such as from a CD or floppy disk containing detection application 106. In other embodiments, such as client-server embodiments, detection application 106 is stored on server computer system 130 and downloaded to host computer system 102A via network 128.

As illustrated, server computer system 130 of client-server system 100 is coupled to host computer system 102A by network 128. Network 128 is any network or network system that is of interest to a user.

Server computer system 130 typically includes: a network interface 134 for communicating with network 128; a processor 132; and a memory 136. As earlier described, in some embodiments, detection application 106 is stored in memory 136 for downloading to host computer system 102A.

Server computer system 130 can further include a display, a keyboard, a mouse, and other input/output (I/O) devices (not shown). As shown in FIG. 1, in one embodiment, host computer systems 102B-102n, similar to host computer system 102A, are coupled to host computer system 102A and server computer system 130 by network 128. Thus, host computer system 102A could receive malicious code from or propagate malicious code to any, all, or some of computer systems 102B-102n and server computer system 130 via network 128.

The particular type of and configuration of host computer system 102A, computer systems 102B-102n, and server computer system 130 are not essential to this embodiment of the present invention. In various embodiments, network interface 134 and I/O interface 110 include analog modems, digital modems, or a network interface card.

FIGS. 2-7 describe exemplary embodiments of processes for detecting and blocking malicious code in accordance with the present invention. The operations of the processes described herein with reference to FIGS. 2-7 are presented in a single threaded execution implementation to more clearly describe the various operations, however in other embodiments, the operations are performed in multi-threaded execution implementations. Thus, in multi-threaded implementations, some operations occur in parallel with other operations.

Further, although the exemplary embodiments described herein with reference to FIGS. 2-7 are presented with reference to a TCP/IP implementation having logical ports, the present invention is applicable to other protocols as well.

Figure 2:
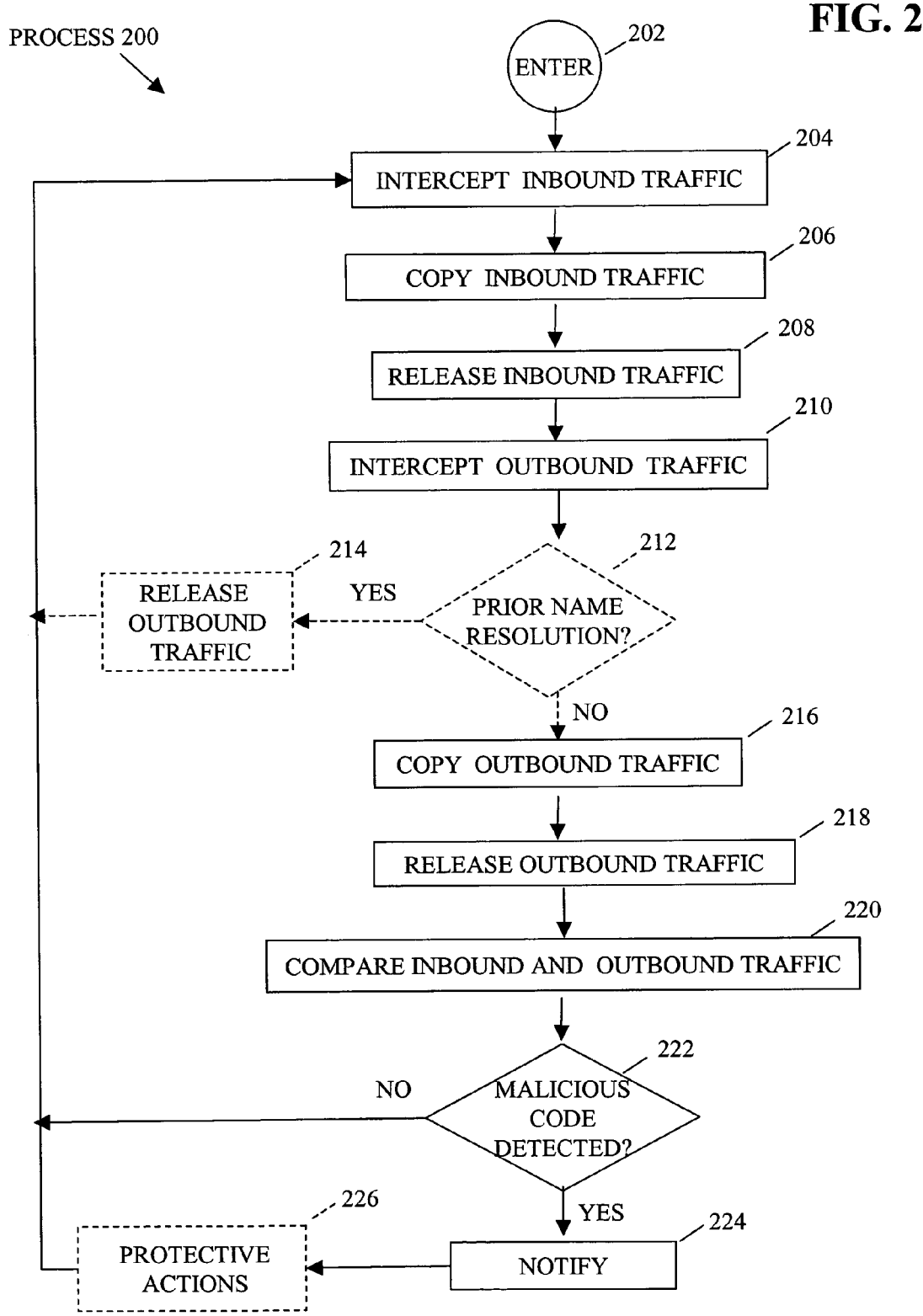
FIG. 2 illustrates a flow diagram of a host computer system process in accordance with one embodiment of the present invention.

FIG. 2 illustrates a flow diagram of a host computer system process 200 in accordance with one embodiment of the present invention. Referring now to FIGS. 1 and 2 together, in one embodiment, execution of detection application 106 by processor 108 results in the operations of process 200 as described below.

In one embodiment, process 200 intercepts inbound traffic to and outbound traffic from host computer system 102A and compares the inbound traffic to the outbound traffic for similarities that are indicative of a malicious code infection of host computer system 102A, such as malicious code propagation. In one embodiment, outbound traffic that is determined to be sufficiently similar to recently received inbound traffic indicates malicious code is detected on host computer system 102A, for example, that a worm has infected and is actively attempting to propagate on host computer system 102A.

In one embodiment, detection application 106 provides a notification of the malicious code detection. In one embodiment, the user of host computer system 102A is notified of the malicious code detection. In some embodiments, notifications of the malicious code detection on host computer system 102A are provided to other users and/or systems, such as system administrators and/or intrusion detection systems (IDS). Further, in some embodiments, protective actions are implemented to hinder or stop the malicious code from spreading to other computer systems and/or to remove the malicious code from host computer system 102A.

Thus, in one embodiment, from an ENTER operation 202, flow moves to an INTERCEPT INBOUND TRAFFIC operation 204.

In INTERCEPT INBOUND TRAFFIC operation 204, inbound traffic is received at host computer system 102A, for example, from network 128 over connection 116 from a source port and intercepted by detection application 106 prior to being delivered to a destination on host computer 102A, such as a listening application or service. The inbound traffic is intercepted by detection application 106 utilizing any of a wide variety of interception means.

For example, some operating systems provide interception mechanisms for filtering traffic, such as the libpcap interface in the LINUX operating system, and the Firewall Hook Driver API in Windows® NT. Also, filter hook drivers, other firewall hook drivers, and intermediate drivers can be written to intercept inbound network traffic. The libpcap interface, the Firewall Hook Driver API, filter hook drivers, other firewall hook drivers, and intermediate drivers are well known to those of skill in the art and not further described herein.

Figure 3:
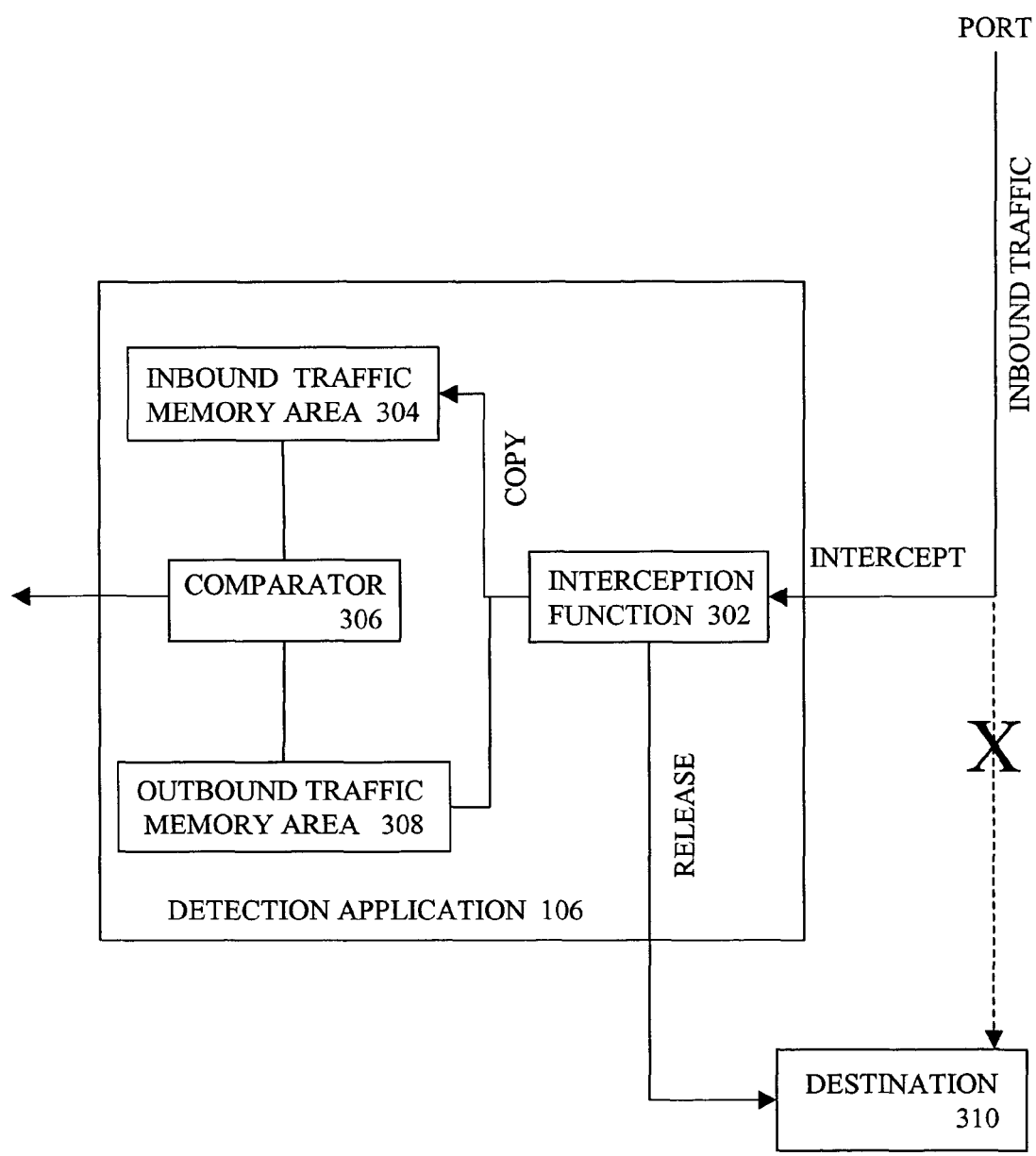
FIG. 3 illustrates a functional diagram of the detection application of FIG. 1 intercepting and copying inbound traffic in accordance with one embodiment of the present invention.

FIG. 3 illustrates a functional diagram of detection application 106 intercepting and copying inbound traffic in accordance with one embodiment of the present invention. Referring now to FIGS. 1-3 together, in one embodiment, detection application 106 includes an inbound traffic interception means, such as those interception mechanisms described above. In one embodiment, the inbound traffic interception mechanism is part of an interception function 302 included in detection application 106.

In one embodiment, at install or start up of detection application 106 on host computer system 102A, interception function 302 establishes the necessary connections between detection application 106 and host computer system 102A to allow detection application 106 to intercept inbound traffic received on host computer system 102A. In one embodiment, the inbound traffic is routed to interception function 302 of detection application 106. From INTERCEPT INBOUND TRAFFIC operation 204, flow moves to a COPY INBOUND TRAFFIC operation 206.

In COPY INBOUND TRAFFIC operation 206, interception function 302 copies the intercepted inbound traffic to an inbound traffic memory area 304. In one embodiment, inbound traffic memory area 304 is a circular cache memory. From COPY INBOUND TRAFFIC operation 206, flow moves to a RELEASE INBOUND TRAFFIC operation 208.

In RELEASE INBOUND TRAFFIC operation 208, the intercepted inbound traffic is released from detection application 106 and allowed to proceed to a destination 310, such as a particular destination application or service. In one embodiment, the intercepted inbound traffic is released by interception function 302. Release of the intercepted inbound traffic (including any malicious code that is present) permits the inbound traffic to proceed to destination 310. From RELEASE INBOUND TRAFFIC operation 208, flow moves to an INTERCEPT OUTBOUND TRAFFIC operation 210.

In INTERCEPT OUTBOUND TRAFFIC operation 210, outbound traffic on host computer system 102A is intercepted by detection application 106 prior to being sent from host computer system 102A. In one embodiment, the outbound traffic is intercepted prior to sending to a destination port that is the same as the port from which the inbound traffic was received, such as the source port.

In other embodiments, the outbound traffic is intercepted prior to sending to a destination port different from the port from which the inbound traffic was received. In one embodiment, the outbound traffic destined for any port is intercepted and compared with traffic recently received on any port. In one embodiment, the outbound traffic is intercepted by detection application 106 utilizing any of a wide variety of interception mechanisms as earlier described in INTERCEPT INBOUND TRAFFIC operation 204, hereby incorporated by reference, except that, rather than the inbound traffic being intercepted, the outbound traffic is intercepted.

Figure 4:
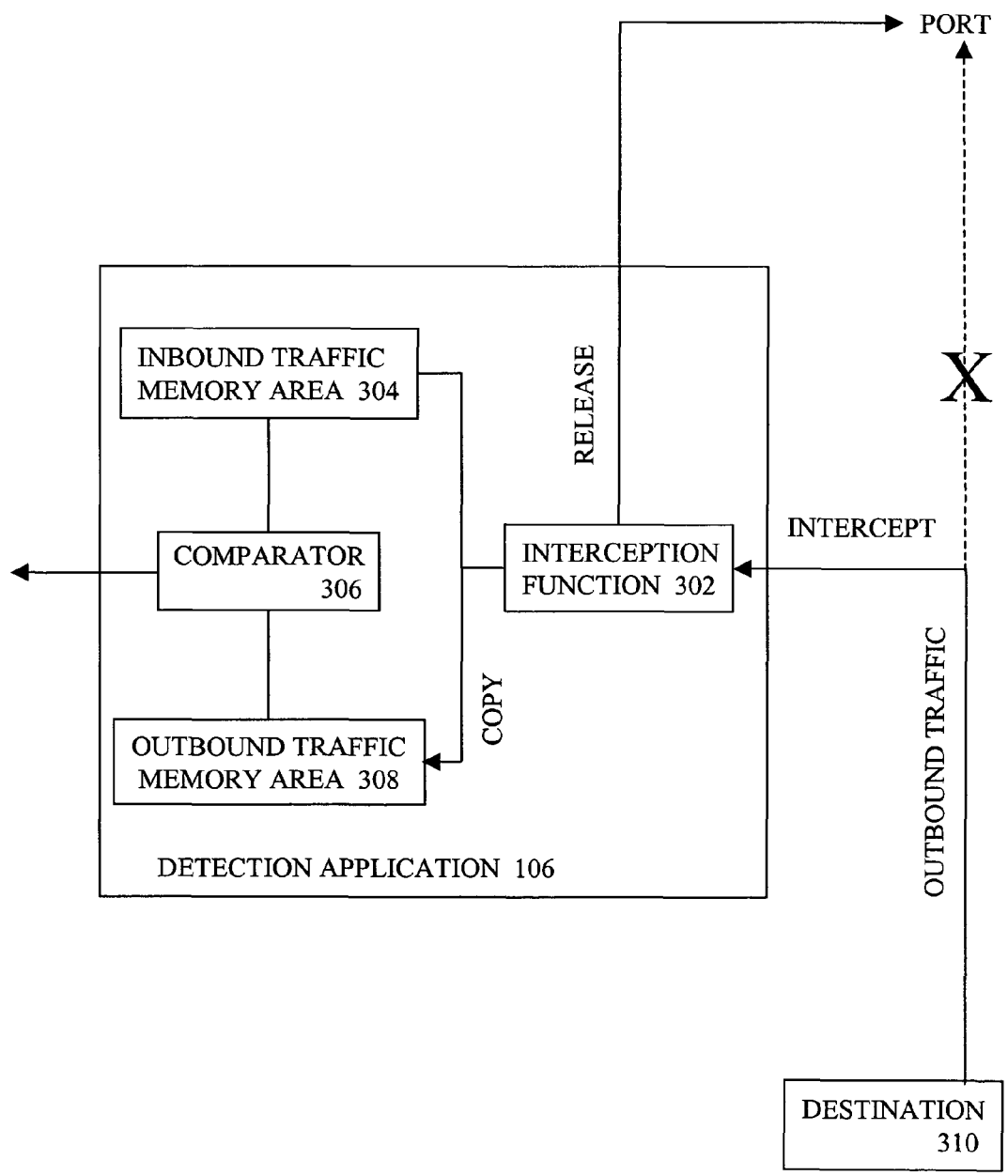
FIG. 4 illustrates a functional diagram of the detection application intercepting and copying outbound traffic in accordance with one embodiment of the present invention.

FIG. 4 illustrates a functional diagram of detection application 106 intercepting and copying outbound traffic in accordance with one embodiment of the present invention. Referring now to FIGS. 1-4 together, in one embodiment, detection application 106 includes an outbound traffic interception mechanism, such as those interception mechanisms earlier described with reference to INTERCEPT INBOUND TRAFFIC operation 204, hereby incorporated by reference. In one embodiment, the outbound traffic interception mechanism is part of interception function 302 included in detection application 106. In one embodiment, the inbound traffic interception mechanism and the outbound traffic interception mechanism are the same interception mechanism, while in other embodiments, the inbound and outbound traffic interception mechanisms are different interception mechanisms.

In one embodiment, at install or start up of detection application 106 on host computer system 102A, interception function 302 establishes the necessary connections between detection application 106 and host computer system 102A to allow detection application 106 to intercept outbound traffic prior to sending from host computer system 102A, such as to a destination port. In one embodiment, the outbound traffic is routed to interception function 302 of detection application 106. From INTERCEPT OUTBOUND TRAFFIC operation 210, flow, optionally, moves to a PRIOR NAME RESOLUTION check operation 212. If optional PRIOR NAME RESOLUTION check operation 212 is not performed, from INTERCEPT OUTBOUND TRAFFIC operation 210, flow moves to COPY OUTBOUND TRAFFIC operation 216.

In optional PRIOR NAME RESOLUTION check operation 212, the intercepted outbound traffic is examined to determine whether it correlates to a prior name resolution, such as a DNS name lookup, performed on host computer system 102A. Name lookups, or name resolutions, are well-known to those of skill in the art and include, for example DNS name lookups, Lightweight Directory Access Protocol (LDAP) name lookups, and Windows® Internet Name Service (WINS) name lookups, among others. Interception of name resolutions, such as name lookups, is well known to those of skill in the art, and include, for example, proxying of the DNS protocol or hooking DNS query APIs. Further, on Windows® platforms most DNS name lookups are routed through local procedure calls (LPCs) to an out of process communication server called SVCHOST. By hooking the LPC channel zwConnectPort, zwReadPort, and zwWritePort APIs to the SVCHOST service, the DNS name lookups are intercepted.

Some malicious code, such as a network worm, spreads in a quasi-random fashion, spreading to other target computer systems throughout the available IP address space. A non-infected host computer system generally performs a name resolution to translate the "friendly" name, such as a DNS name, into an IP address. However, since some malicious code, such as a network worm, does not have access to the "friendly" name of a target computer system, the malicious code spreads via the IP address alone. Thus, if the IP address of the intercepted outbound traffic correlates to a prior name resolution, such as a prior DNS name lookup, for that IP address by host computer system 102A, in one embodiment, the intercepted outbound traffic is optionally excluded from the remainder of the process, thus reducing the processing load on host computer system 102A. For example, in one embodiment, the intercepted outbound traffic is excluded from operations 216, 218, 220, 222, 224 and 226.

In one embodiment, the optional prior name resolution correlation is performed by a prior name resolution correlation function present in interception function 302, while, in other embodiments, the optional prior name resolution correlation is performed by a separate prior name resolution correlation function (not shown) in detection application 106. The correlation of a prior name resolution to an IP address associated with the outbound traffic is performed in any of a variety of ways that are well-known to those of skill in the art.

If a prior name resolution correlation is affirmed, i.e., there was a prior name look up for the IP address associated with the outbound traffic, from optional PRIOR NAME RESOLUTION check operation 212, flow moves to a RELEASE OUTBOUND TRAFFIC operation 214.

In RELEASE OUTBOUND TRAFFIC operation 214, the intercepted outbound traffic is released from detection application 106 for sending from host computer system 102A, such as for sending to a destination port over connection 116. In one embodiment, the intercepted outbound traffic is released from interception function 302. From RELEASE OUTBOUND TRAFFIC operation 214, flow moves to INTERCEPT INBOUND TRAFFIC operation 204.

Returning to optional PRIOR NAME RESOLUTION check operation 212, if a prior name resolution correlation is not affirmed, from optional PRIOR NAME RESOLUTION check operation 212, flow moves to COPY OUTBOUND TRAFFIC operation 216.

In COPY OUTBOUND TRAFFIC operation 216, interception function 302 copies the intercepted outbound traffic to an outbound traffic memory area 308. In one embodiment, outbound traffic memory area 308 is a circular cache memory. From COPY OUTBOUND TRAFFIC operation 216, flow moves to a RELEASE OUTBOUND TRAFFIC operation 218.

In RELEASE OUTBOUND TRAFFIC operation 218, the intercepted outbound traffic is released from detection application 106 and allowed to proceed for sending from host computer system 102A to a destination port. In one embodiment, the intercepted outbound traffic is released from interception function 302. From RELEASE OUTBOUND TRAFFIC operation 218, flow moves to a COMPARE INBOUND AND OUTBOUND TRAFFIC operation 220.

In COMPARE INBOUND AND OUTBOUND TRAFFIC operation 220, one or more portions of the copied outbound traffic in outbound traffic memory area 308 is compared to one or more portions of the copied inbound traffic in inbound traffic memory area 304 by a comparator 306. In one embodiment, comparator 306 compares the one or more portions of the copied outbound traffic in outbound traffic memory area 308 to the one or more portions of the copied inbound traffic in inbound traffic memory area 304 to allow a determination whether malicious code, such as a network worm, is detected. In one embodiment, comparator 306 compares the layer seven (7) protocol payloads; that is, comparator 306 ignores transport headers, such as TCP/IP or user datagram protocol (UDP) headers.

Any of a wide variety of similarity comparison techniques can be utilized to provide a similarity comparison. In one embodiment, similarity comparison techniques providing for some tolerance of variance are used. For example, some malicious code, such as some network worms, bind with local import tables at runtime and these bindings can differ from instance to instance. These minor differences cause the traffic for the incoming copy of a network worm to differ slightly from the outgoing traffic as the network worm spreads itself. Thus, in one embodiment, a function of the bytes in the traffic is used in order to provide some tolerance of these variances.

In one embodiment, a similarity comparison function incorporates a time reference so that subsequent outbound traffic is compared to recently received inbound traffic. For example, assume a portion "O" of the copied outbound traffic in outbound traffic memory area 308 includes time stamps of transmission, and a portion "I" of the copied inbound traffic in inbound memory area 304 includes time stamps for receipt. Time stamping of traffic is well-known to those of skill in the art and not further described herein. Let "X" be a configurable sample portion length (in bytes) to be used in testing for a similarity match. Let "L" be the length (in bytes) of a segment for the purposes of finding an initial match between the copied inbound traffic and the copied outbound traffic. Let O(n) represent the nth segment of the portion O, and I(m) represent the mth segment of the portion I.

In one embodiment, comparator 306 detects similarities between the copied inbound and the copied outbound traffic as follows. First, for each outbound segment O(n) in the portion O, within the range R of the portion I that was received before transmission of O(n), where the length of the range R is no shorter than X, search for a segment I(m) such that I(m)==O(n), i.e., I(m) matches O(n). For each such match, compare the next X bytes adjacent to the matching segments from each inbound traffic memory area 304 and outbound traffic memory area 308 with each other and count the number of matches. Let Y be that number of matches.

If Y is greater than or equal to some configurable threshold Z (Y≧Z), the X byte samples of portion O and portion I are determined to be similar. In one embodiment, the threshold Z is specified as a percentage of X instead of an absolute count, which makes the threshold Z*X (Z multiplied by X), so Y must be greater than or equal to (≧) Z*X (Z multiplied by X) for the samples to be considered similar. In one example, a set of default parameters for this function is L=4, X=512, and Z=85%. In one embodiment, the parameters X, L, and Z are configurable and adjusted as desired.

Further variations of this function are also possible. For example, in other embodiments, fuzzy or lossy comparison techniques are used to account for small changes in a malicious code's image, such as due to fix-ups or other reasons.

In other embodiments, other similarity comparison techniques are used, such as comparisons of minimum matching lengths of portions of the copied outbound traffic and the copied inbound traffic. Kolmogorov complexity algorithms and related work provide examples of available similarity functions. For example, see "Linking Chain Letters", by C. Bennett, Ming Li, and Bin Ma, available at http://www-.math.uwaterloo.ca/~mli/chain9.ps, pp. 1-7, and "Chain Letters and Evolutionary Histories" by Charles H. Bennett, Min Li, and Bin Ma, Scientific American, June 2003, pp. 76-81.

Also, in some embodiments, fuzzy or lossy hashing functions are used to determine if portions of the copied inbound and copied outbound traffic are similar. In still other embodiments, protocol aware comparisons are used in order to better identify relevant content for comparison. From COMPARE INBOUND AND OUTBOUND TRAFFIC operation 220, flow moves to a MALICIOUS CODE DETECTED check operation 222.

In MALICIOUS CODE DETECTED check operation 222, the results of the comparison in COMPARE INBOUND AND OUTBOUND TRAFFIC operation 220 are evaluated to determine if malicious code is detected. Determination of a malicious code detection is made in accordance with the particular similarity comparison technique utilized in COMPARE INBOUND AND OUTBOUND TRAFFIC operation 220, for example, meeting or exceeding a specified similarity comparison threshold.

If it is determined that malicious code is not detected, from MALICIOUS CODE DETECTED check operation 222, flow moves to INTERCEPT INBOUND TRAFFIC operation 204.

If it is determined that malicious code is detected, from MALICIOUS CODE DETECTED check operation 222, flow moves to a NOTIFY operation 224.

In NOTIFY operation 224, detection application 106 provides notification of the malicious code detection. In one embodiment, the user of host computer system 102A is notified of the malicious code detection. In various embodiments, the user is notified using any one of a number of techniques, such as by using a pop-up window, by writing to a file, and/or by logging the event. In some embodiments, detection application 106 provides notification of the malicious code detection to other individuals, such as a system administrator, as well as to other systems, such as an intrusion detection system (IDS). From NOTIFY operation 224, flow moves to an optional PROTECTIVE ACTIONS operation 226. If optional PROTECTIVE ACTIONS operation 226 is not performed, from NOTIFY operation 224, flow moves to INTERCEPT INBOUND TRAFFIC operation 204.

In optional PROTECTIVE ACTIONS operation 226, any, some or all of a wide variety of protective actions are implemented. For example, in one embodiment, the one or more portions of the copied outbound traffic and/or the copied inbound traffic, determined to be similar, are submitted to an IDS system or written to file. In some embodiments, the inbound and/or the outbound traffic is shut down until user intervention is performed on host computer system 102A to remove or disable the malicious code. Once the protective actions have been taken, from optional PROTECTIVE ACTIONS operation 226, flow moves to INTERCEPT INBOUND TRAFFIC operation 204.

In the embodiments, described with reference to process 200 and FIGS. 2-4, both the inbound traffic and the outbound traffic are intercepted, copied to a respective memory area, and released prior to a comparison process and a determination whether malicious code is detected. This permits the host computer system 102A to process inbound and outbound traffic with little impact on throughput due to the processes of detection application 106. Further, utilization of optional PRIOR NAME RESOLUTION check operation 212 permits outbound traffic with an affirmed prior name resolution, such as a DNS name lookup, to be excluded from the determination process, thus reducing the load on host computer system 102A introduced by process 200.

However, as the outbound traffic is released after copying to outbound traffic memory area 308, some infected outbound traffic could be released until notification, and optionally, protective actions, are implemented. Thus, in some instances, it is desirable to prevent the release of the outbound traffic until a determination is made as to whether malicious code is detected as further described herein with reference to process 500 and FIGS. 5 and 6.

Figure 5:
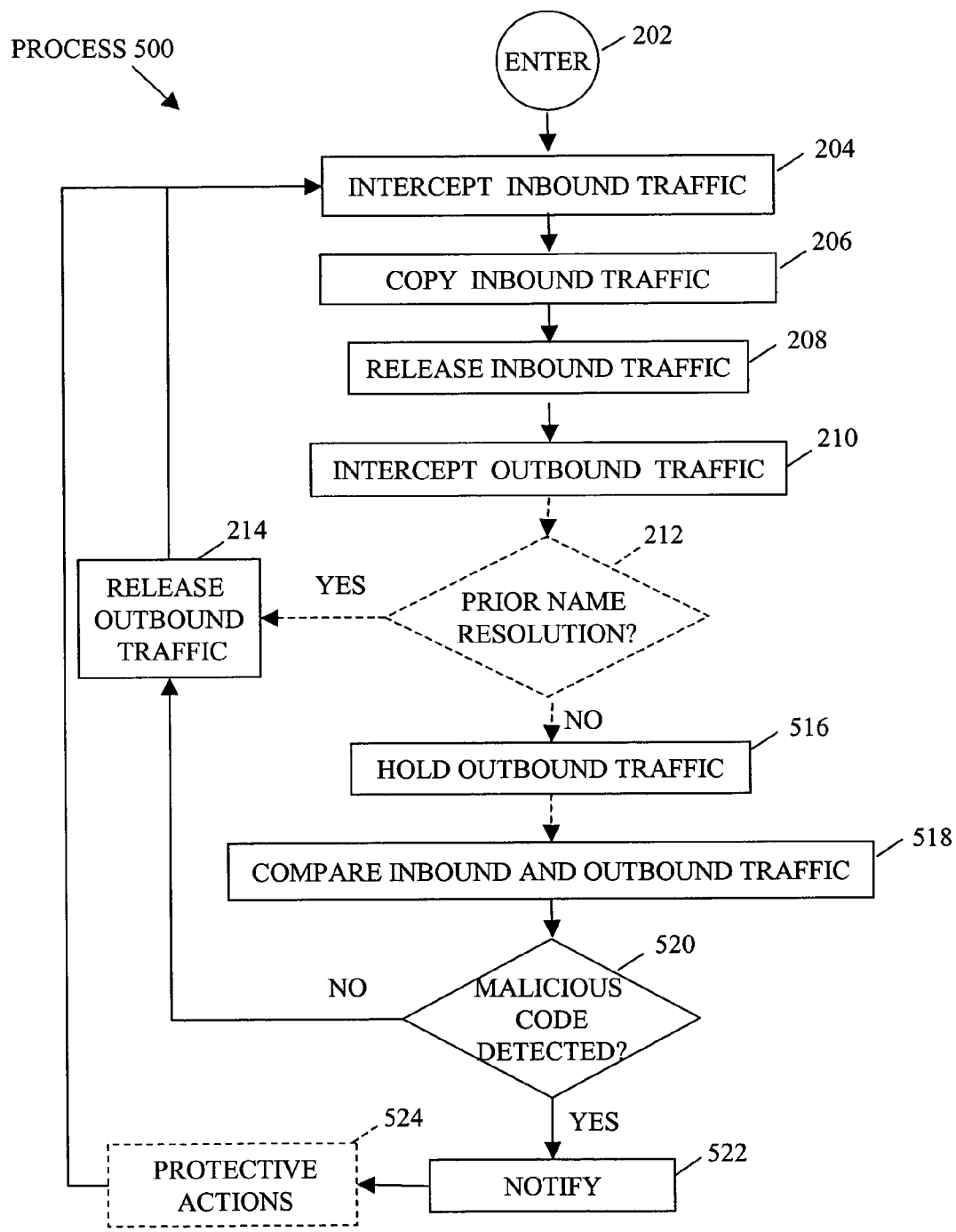
FIG. 5 illustrates a flow diagram of a host computer system process in accordance with another embodiment of the present invention.

FIG. 5 illustrates a flow diagram of a host computer system process 500 in accordance with another embodiment of the present invention. Referring now to FIGS. 1-6 together, in one embodiment, operations 204, 206, 208, 210, 212, and 214, hereby incorporated by reference, are performed as earlier described with reference to FIGS. 1-3.

If optional PRIOR NAME RESOLUTION check operation 212 is not performed, from INTERCEPT OUTBOUND TRAFFIC operation 210, flow moves to a HOLD OUTBOUND TRAFFIC operation 516.

If optional PRIOR NAME RESOLUTION check operation 212 is performed and a prior name resolution is affirmed, from PRIOR NAME RESOLUTION check operation 212, flow moves to RELEASE OUTBOUND TRAFFIC OPERATION 214.

If optional PRIOR NAME RESOLUTION check operation 212 is performed and a prior name resolution is not affirmed, from PRIOR NAME RESOLUTION check operation 212, flow moves to HOLD OUTBOUND TRAFFIC operation 516.

In HOLD OUTBOUND TRAFFIC operation 516, interception function 302 buffers, i.e., holds or stalls, the intercepted outbound traffic in outbound traffic memory area 308. Thus, differently from process 200 where the intercepted outbound traffic is copied and then released, in process 500, the intercepted outbound traffic is held in outbound traffic memory area 308.

Figure 6:
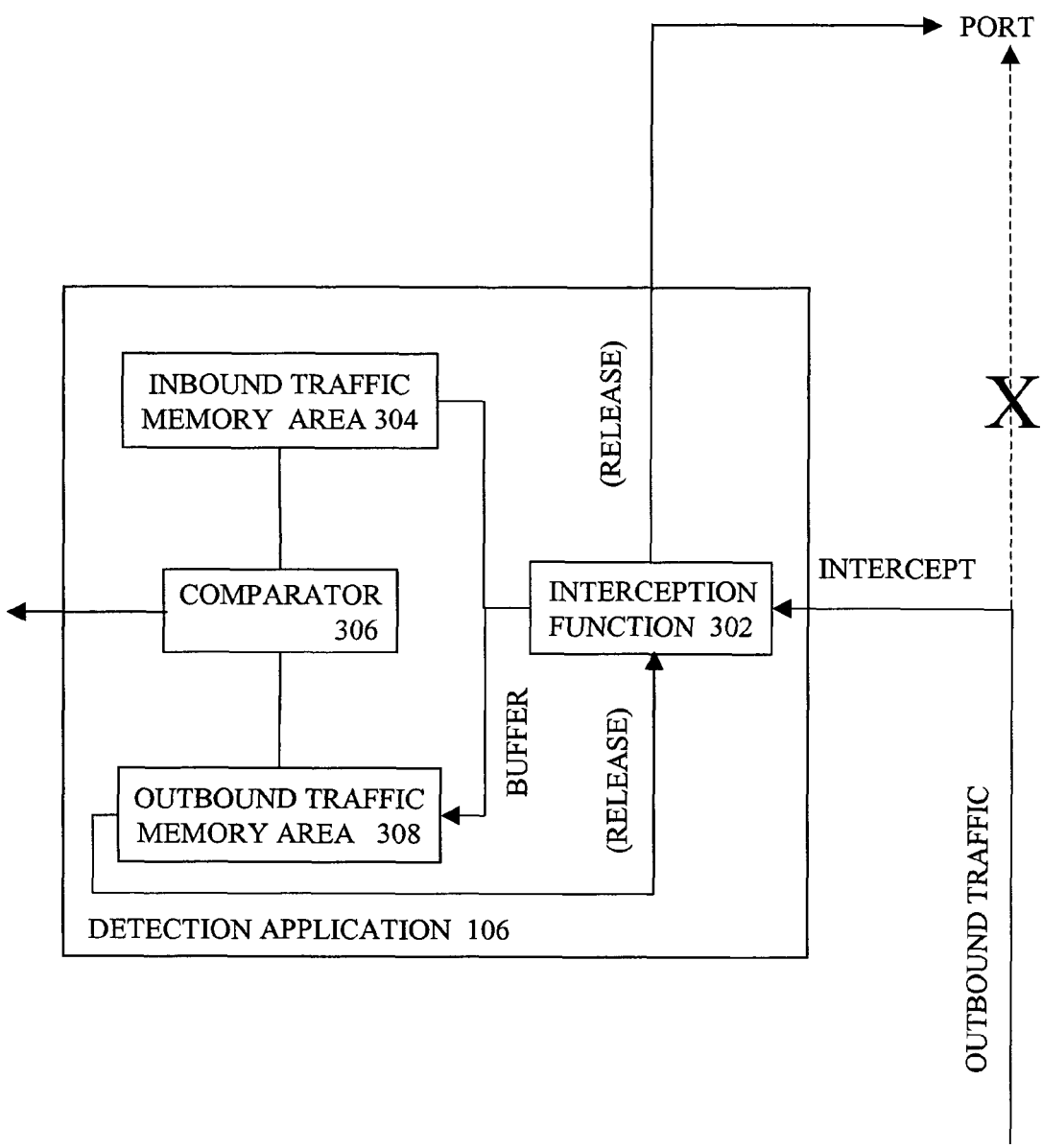
FIG. 6 illustrates a functional diagram of the detection application intercepting and holding outbound traffic in accordance with one embodiment of the present invention.

FIG. 6 illustrates a functional diagram of detection application 106 intercepting and holding outbound traffic in accordance with one embodiment of the present invention. In FIG. 6, outbound traffic on host computer system 102A is intercepted by interception function 302 and routed to outbound traffic memory area 308 where it is buffered, e.g., held, rather than being copied and released as earlier described with reference to process 200 and FIG. 2, hereby incorporated by reference. From HOLD OUTBOUND TRAFFIC operation 516, flow moves to a COMPARE INBOUND AND OUTBOUND TRAFFIC operation 518.

In COMPARE INBOUND AND OUTBOUND TRAFFIC operation 518, one or more portions of the buffered outbound traffic in outbound traffic memory area 308 is compared to one or more portions of the copied inbound traffic in inbound traffic memory area 304 by comparator 306. In one embodiment, comparator 306 compares the one or more portions of the buffered outbound traffic in outbound traffic memory area 308 to the one or more portions of the copied inbound traffic in inbound traffic memory area 304 to determine if malicious code, such as a network worm, is detected.

In some embodiments, the similarity comparison techniques earlier described with reference to process 200 and COMPARE INBOUND AND OUTBOUND TRAFFIC operation 220, hereby incorporated by reference, are utilized except that, rather than copied outbound traffic being compared to copied inbound traffic, in process 500, buffered outbound traffic is compared to copied inbound traffic.

Additionally, with reference to the earlier described exemplar embodiment of the similarity comparison function with time reference, further variations of the similarity comparison function are also possible. For example if X is large, a particular implementation which requires holding up the outbound traffic until it is determined whether malicious code is detected can require holding back too much traffic. Thus, in one embodiment, the similarity check is performed using this function with a smaller X, and the buffered outbound traffic is not held unless at least N adjacent samples of size X have been considered similar, in other words, the comparison is performed in a piecewise fashion N times over segments of a useable size X. From COMPARE INBOUND AND OUTBOUND TRAFFIC operation 518, flow moves to a MALICIOUS CODE DETECTED check operation 520.

In MALICIOUS CODE DETECTED check operation 520, the results of COMPARE INBOUND AND OUTBOUND TRAFFIC operation 518 are evaluated to determine if malicious code is detected. In one embodiment, determination of a malicious code detection is made in accordance with the particular similarity comparison technique utilized in COMPARE INBOUND AND OUTBOUND TRAFFIC operation 518, for example, meeting or exceeding a specified similarity comparison threshold.

If it is determined that malicious code is not detected, from MALICIOUS CODE DETECTED check operation 520, flow moves to RELEASE OUTBOUND TRAFFIC operation 214, and the buffered outbound traffic that was compared is released for sending from host computer system 102A. If it is determined that malicious code is detected, from MALICIOUS CODE DETECTED check operation 520, flow moves to a NOTIFY operation 522.

In NOTIFY operation 522, detection application 106 provides notification of the malicious code detection as earlier described with reference to process 200 and NOTIFY operation 224, hereby incorporated by reference. From NOTIFY operation 522, flow moves to an optional PROTECTIVE ACTIONS operation 524. If optional PROTECTIVE ACTIONS operation 524 is not performed, as the outbound traffic is not released, in one embodiment, the buffered outbound traffic is terminated, for example, by dropping the outbound connection, and from NOTIFY operation 522, flow moves to INTERCEPT INBOUND TRAFFIC operation 204.

If optional PROTECTIVE ACTIONS operation 524 is performed, in one embodiment, any, some, or all of a wide variety of protective actions are implemented. For example, in one embodiment, one or more portions of the copied inbound traffic and/or the buffered outbound traffic that are determined to be similar are submitted to other users, such as a system administrator, other systems, such an IDS system, and/or written to file.

In some embodiments, the outbound traffic is terminated, thus blocking propagation of the malicious code from host computer system 102A. In some embodiments, inbound traffic and/or outbound traffic is shut down until user intervention is performed on host computer system 102A to remove or disable the malicious code. From optional PROTECTIVE ACTIONS operation 524, flow moves to INTERCEPT INBOUND TRAFFIC operation 204.

Thus, in process 500, in one embodiment, buffered outbound traffic is not released until optional PRIOR NAME RESOLUTION check operation 214 is affirmed or until a comparison is performed and a determination is made that malicious code is not detected. This prevents malicious code from being spread to other computer systems through transmission of the outbound traffic from host computer system 102A.

Examples of processes 200 and 500 in accordance with embodiments of the present invention are described herein as implemented on a host computer system 102A where inbound traffic is received from a source port and sent to a destination port that is the same or different from the source port. In other embodiments in accordance with the present invention, processes 200 and 500 are implemented on host computer system 102A that is functioning as a multi-address/interface host computer system, such as a router.

In these embodiments, host computer system 102A receives all inbound and outbound traffic to and from ports on multiple addresses (machines/computer systems). Inbound traffic for each address served by the router is copied to inbound traffic areas on a per address and port basis and outbound traffic is copied or buffered (depending on the embodiment) in outbound traffic memory areas on a per address and per destination port basis as further described herein with reference to FIG. 7.

Typically, in routing inbound and outbound traffic to a destination, information in the inbound and outbound traffic, is utilized by host computer system 102A, i.e., the router, to determine which traffic is going to or coming from which address and port (if applicable). In one embodiment, detection application 106 uses that information, such as packet header information in TCP/IP packets, in implementing the present invention on a router. In one embodiment, inbound traffic is copied to inbound traffic memory areas on a per port basis and outbound traffic is copied or buffered (depending on the embodiment) in outbound traffic memory areas on a per port basis as further described herein with reference to FIG. 7.

Figure 7:
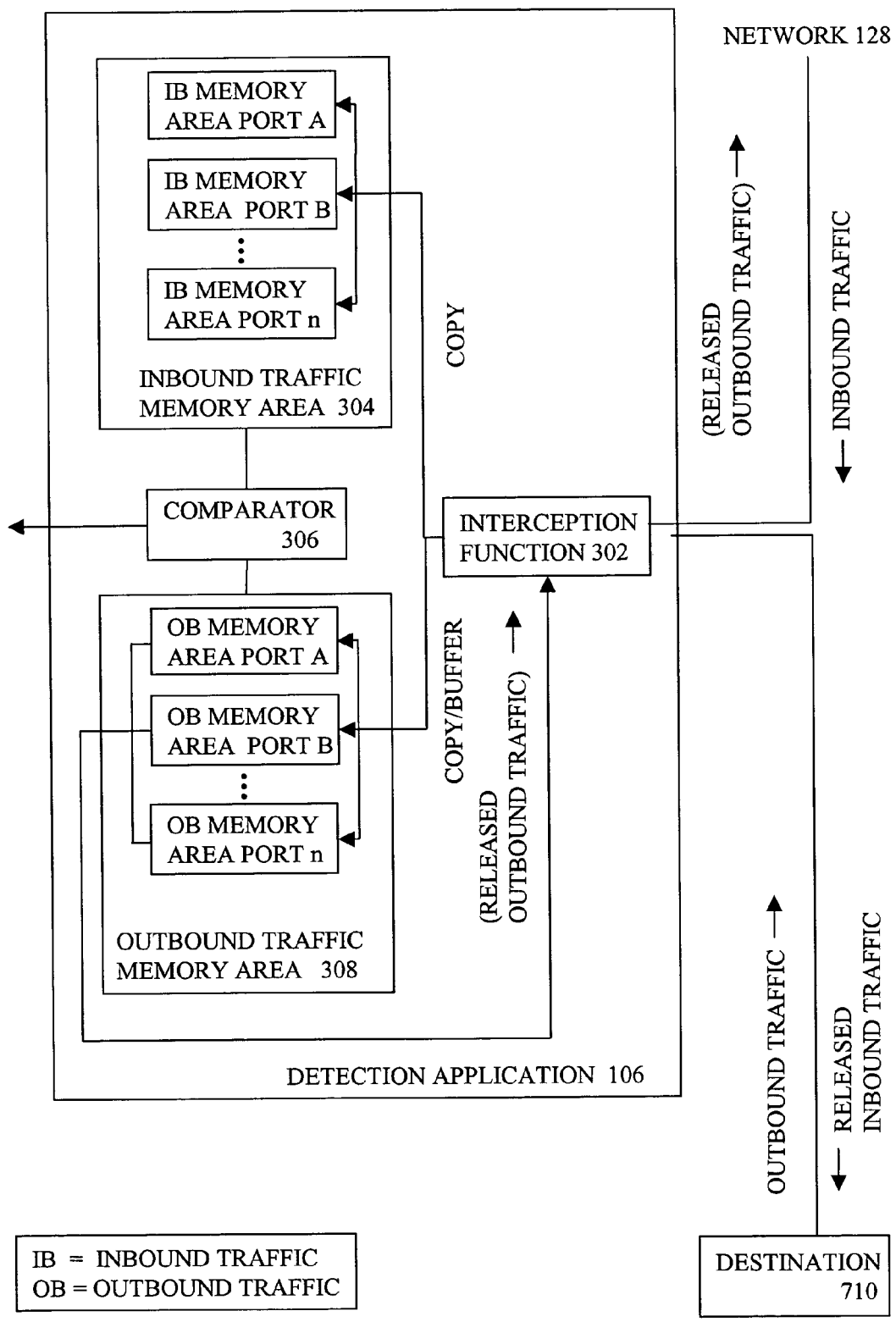
FIG. 7 illustrates a functional diagram of the detection application of FIG. 1 including port associated memory areas in accordance with another embodiment of the invention.

FIG. 7 illustrates a functional diagram of detection application 106 including port associated memory areas in accordance with one embodiment of the invention. In FIG. 7, in one embodiment, inbound traffic from any ports of connection 116 is intercepted by interception function 302 and copied to an associated memory area in inbound traffic memory area 304 on a per port (per address) basis prior to being delivered to a destination 710 on host computer system 102A. For example, assume connection 116 is a TCP/IP connection having possible logical ports 0-n. Inbound traffic from network 128 from a port 0 is copied to inbound traffic memory area port 0 (IB memory area port 0). Similarly, inbound traffic from ports 2-n is copied to inbound traffic memory areas ports 2-n, respectively. Thus, in one embodiment, operations 204, 206, and 208 of process 200 and process 500, hereby incorporated by reference, are implemented on a per port (per address) basis by detection application 106 on host computer system 102A.

Further, in one embodiment, outbound traffic destined for output from host computer system 102A to a destination port 0-n (of a destination address) is intercepted and copied or buffered (depending on the embodiment) to an associated memory area in outbound traffic memory area 308 prior to sending to the destination port 0-n. For example, outbound traffic destined for port 0 is copied or buffered in outbound memory area port 0 (OB memory area port 0). Similarly, outbound traffic destined for port 2-n are copied or buffered in outbound traffic memory areas port 2-port n. Thus, in one embodiment, operations 210, 212, 214, 216, and 218 of process 200 and operations 210, 212, 214 and 516 of process 500, hereby incorporated by reference, are implemented on a per port (per address) basis by detection application 106 on host computer system 102A.

In one embodiment, the inbound traffic in inbound traffic memory area 304 and the outbound traffic in outbound traffic memory area 308 are compared using any of the similarity comparison techniques earlier described with reference to processes 200 and 500, hereby incorporated by reference, on a per port (per address) basis. Thus, for example, in one embodiment, in operation 220 of process 200 and in operation 518 of process 500, hereby incorporated by reference, copied inbound traffic in IB memory area port 0 is compared to copied or buffered (depending on the embodiment) outbound traffic in OB memory area port 0 separately from a comparison of copied inbound traffic in IB memory area port 0 and copied or buffered (depending on the embodiment) outbound traffic in OB memory area port 0 (and similarly through IB memory area port n and OB memory area port n).

In other embodiments, copied inbound traffic in all IB memory areas port 0-port n is compared to copied or buffered (depending on the embodiment) outbound traffic in all OB memory areas port 0-port n. Further, in still other embodiments, copied inbound traffic in selected IB memory areas port 0-port n is compared to copied or buffered (depending on the embodiment) outbound traffic in selected OB memory areas port 0-port n. For example, copied inbound traffic in all IB memory areas port 0-port n, is compared to copied or buffered outbound traffic in one of OB memory areas port 0-port n, such as OB memory area port 0.

In one embodiment, the results of the comparison process are used to determine whether malicious code is detected on a per port (per address) basis. For example, in one embodiment, in operation 222 of process 200 and in operation 520 of process 500, hereby incorporated by reference, the results of the comparison process are used to determine whether malicious code is detected on a per port (per address) basis in accordance with the utilized similarity comparison technique.

Further, in one embodiment, the notification and optional implementation of any protective actions occur on a per port (per address) basis. Thus, for example, in operations 224 and 226 of process 200 and in operations 522 and 524 of process 500, hereby incorporated by reference, notification and optional protective actions are made on a per port (per address) basis. In other embodiments, the notification and optional protective actions are made in different ways based on the results of the utilized similarity comparison technique.

Thus, by comparing outbound traffic on a host computer system to recently received inbound traffic on the host computer system, embodiments in accordance with the present invention, determine whether malicious code is detected on the host computer system. If malicious code is detected, a user of the host computer system, as well as, optionally, other individuals or systems, such as intrusion detection systems (IDS), are notified of the detection.

If desired, protective actions are initiated to hinder or block the propagation of the malicious code from the host computer system to other computer systems, as well as to remove or inactivate the malicious code on the host computer system. Prior identification of the malicious code, such as a worm, is not required, thus allowing unknown viruses that exhibit the earlier described malicious code network traffic features to be detected, and, optionally, blocked.

As earlier described, although the various operations of the processes described herein are presented in an exemplary single threaded execution implementation order, other orders are possible, as well as multi-threaded execution implementations. For example, in one embodiment, four separate threads of execution are implemented: a first thread that is intercepting inbound traffic and copying the inbound traffic to inbound traffic memory area 304; a second thread that is intercepting outbound traffic and copying or buffering the outbound traffic to outbound traffic memory area 308; a third thread that is pushing comparison work items onto a queue, for example, in comparator 306, between inbound traffic memory area 304 and outbound traffic memory area 308; and a fourth thread that is popping comparison work items off the queue, performing the appropriate comparisons (comparator 306), and implementing notification and/or protective actions based on the results of the comparisons.

Herein, although detection application 106 is referred to as an application, this is illustrative only. Detection application 106 should be capable of being called from an application or from the operating system. In one embodiment, an application is generally defined to be any executable code. Moreover, those of skill in the art will understand that when it is described that an application or an operation takes some action, the action is the result of executing one or more instructions by a processor.

While embodiments in accordance with the present invention have been described for a client-server configuration and a network system, an embodiment of the present invention may be carried out using any suitable hardware configuration involving a personal computer, a workstation, a portable device, or a network of computer devices. Other network configurations, e.g., peer-to-peer, web-based, intranet, and internet network configurations, are used in other embodiments. Further in view of this disclosure, those of skill in the art can implement various embodiments of the present invention in a wide variety of physical hardware configurations using an operating system and computer programming language of interest to the user.

Herein, a computer program product comprises a medium configured to store or transport computer readable code in accordance with an embodiment of the present invention. Some examples of computer program products configured to store computer readable code are CD-ROM discs, DVDs, ROM cards, floppy discs, magnetic tapes, computer hard drives, and servers on a network. Some examples of computer program products configured to transport computer readable code are signals transmitted over a network representing computer readable code.

As illustrated in FIG. 1, this medium may belong to the computer system itself. However, the medium also may be removed from the computer system. For example, detection application 106 may be stored in memory 136 that is physically located in a location different from processor 108. Processor 108 should be coupled to the memory 136. This could be accomplished in a client-server system, or alternatively via a connection to another computer via modems and analog lines, or digital interfaces and a digital carrier line.

More specifically, in one embodiment, host computer system 102A and/or server computer system 130 is a portable computer, a workstation, a two-way pager, a cellular telephone, a digital wireless telephone, a personal digital assistant, a server computer, an Internet appliance, or any other device that includes components that can execute the detection functionality in accordance with at least one of the embodiments as described herein. Similarly, in another embodiment, host computer system 102A and/or server computer system 130 is comprised of multiple different computers, wireless devices, cellular telephones, digital telephones, two-way pagers, or personal digital assistants, server computers, or any desired combination of these devices that are interconnected to perform, the methods as described herein.

In view of this disclosure, the functionalities of detection application 106 in accordance with one embodiment of the present invention are implementable in a wide variety of computer system configurations. In addition, functionalities of detection application 106 could be stored as different modules in memories of different devices.

For example, detection application 106 could initially be stored in server computer system 130, and, as necessary, a portion of detection application 106 could be transferred to host computer system 102A and executed on host computer system 102A. Consequently, part of the detection functionalities would be executed on processor 132 of server computer system 130, and another part would be executed on processor 108 of host computer system 102A.

In yet another embodiment, detection application 106 is stored in memory 136 of server computer system 130. Detection application 106 is transferred over network 128 to memory 112 on host computer system 102A. In this embodiment, network interface 134 and I/O interface 110 would include analog modems, digital modems, or a network interface card. If modems are used, network 128 includes a communications network, and detection application 106 is downloaded via the communications network.

Additionally, with respect to FIG. 7, although inbound traffic memory area 304 and outbound traffic memory area 308 are described as including one or more memory areas on a per port basis, e.g., IB memory areas port 0-port n and OB memory areas port 0-port n, in other embodiments, one or more inbound traffic memory areas 304 and one or more outbound traffic memory areas 308 are instead used on a per port basis.

This disclosure provides exemplary embodiments of the present invention. The scope of the present invention is not limited by these exemplary embodiments. Numerous variations, whether explicitly provided for by the specification or implied by the specification or not, may be implemented by one of skill in the art in view of this disclosure.

What is claimed is:

1. A method comprising:
   intercepting inbound traffic on a host computer system;
   copying the inbound traffic to an inbound traffic memory area, the copying the inbound traffic generating copied inbound traffic;
   releasing the inbound traffic;
   intercepting outbound traffic on the host computer system;
   buffering the outbound traffic in an outbound traffic memory area, the buffering the outbound traffic generating buffered outbound traffic;
   comparing at least a portion of outbound traffic on the host computer system to at least a portion of inbound traffic on the host computer system, wherein the inbound traffic is received on the host computer system from a source external to the host computer system, and wherein the outbound traffic is generated on the host computer system for transmission from the host computer system to a destination external to the host computer system, and further wherein the at least a portion of the outbound traffic is subsequent in time to the at least a portion of the inbound traffic;
   determining if malicious code is detected on the host computer system based on the comparing;
   when malicious code is detected, providing a notification of the malicious code detection; and
   if malicious code is not detected, releasing the buffered outbound traffic.

2. The method of claim 1, wherein the comparing is performed using a similarity comparison technique.

3. The method of claim 1, wherein the inbound traffic is received at the host computer system from a source port,
   and wherein the outbound traffic is for sending to a destination port,
   and further wherein the source port and the destination port are the same port.

4. The method of claim 1, wherein the inbound traffic is received on the host computer system from a source port,
   and wherein the outbound traffic is for sending to a destination port,
   and further wherein the source port and the destination port are different ports.

5. The method of claim 1, further comprising:
   implementing protective actions.

6. The method of claim 1, wherein the comparing comprises:
   comparing at least a portion of the copied inbound traffic with at least a portion of the buffered outbound traffic.

7. The method of claim 1, further comprising:
   prior to the buffering the outbound traffic, if the outbound traffic correlates to a prior name resolution lookup performed on the host computer system, releasing the outbound traffic.

8. The method of claim 1, wherein the inbound traffic is copied to the inbound traffic memory area on a per port basis,
   and wherein the outbound traffic is buffered to the outbound traffic memory area on a per destination port basis.

9. A method comprising:
   intercepting inbound traffic on a host computer system, wherein the inbound traffic is received on the host computer system from a source external to the host computer system;
   copying the inbound traffic to an inbound traffic memory area, the copying the inbound traffic generating copied inbound traffic;
   releasing the inbound traffic;
   intercepting outbound traffic on the host computer system wherein the outbound traffic is generated on the host computer system for transmission from the host computer system to a destination external to the host computer system;
   buffering the outbound traffic in an outbound traffic memory area, the buffering the outbound traffic generating buffered outbound traffic;
   comparing at least a portion of the copied inbound traffic with at least a portion of the buffered outbound traffic;
   determining if malicious code is detected on the host computer system based on the comparing;
   if malicious code is detected, providing a notification of the malicious code detection; and
   if malicious code is not detected, releasing the at least a portion of the buffered outbound traffic.

10. The method of claim 9, wherein the comparing is performed using a similarity comparison technique.

11. The method of claim 9, wherein the at least a portion of the buffered outbound traffic is subsequent in time to the at least a portion of the copied inbound traffic.

12. The method of claim 9, further comprising:
    prior to buffering the outbound traffic, if the outbound traffic correlates to a prior name resolution lookup performed on the host computer system, releasing the outbound traffic.

13. The method of claim 9, wherein the inbound traffic is copied to the inbound traffic memory area on a per port basis,
    and wherein the outbound traffic is buffered in the outbound traffic memory area on a per destination port basis.

14. The method of claim 9, further comprising:
    wherein if malicious code is detected, implementing protective actions.

15. A computer-program product comprising a computer readable medium configured to store computer program code comprising:
    a detection application for intercepting inbound traffic on a host computer system;
    the detection application further for copying the inbound traffic to an inbound traffic memory area, the copying the inbound traffic generating copied inbound traffic;
    the detection application further for releasing the inbound traffic;
    the detection application further for intercepting outbound traffic on the host computer system;

the detection application further for buffering the outbound traffic in an outbound traffic memory area, the buffering the outbound traffic generating buffered outbound traffic;

the detection application further for comparing at least a portion of outbound traffic on the host computer system to at least a portion of inbound traffic on the host computer system, wherein the inbound traffic is received on the host computer system from a source external to the host computer system, and wherein the outbound traffic is generated on the host computer system for transmission from the host computer system to a destination external to the host computer system, and further wherein the at least a portion of the outbound traffic is subsequent in time to the at least a portion of the inbound traffic;

the detection application further for determining if malicious code is detected on the host computer system based on the comparing;

when malicious code is detected, the detection application further for providing a notification of the malicious code detection; and when malicious code is not detected, the detection application further for releasing the buffered outbound traffic.

16. The computer-program product of claim 15, the computer readable medium configured to store computer program code further comprising:

wherein the comparing is performed using a similarity comparison technique.

17. The computer-program product of claim 15, the computer readable medium configured to store computer program code further comprising:

wherein if malicious code is detected, the detection application further for implementing protective actions.

* * * * *

UNITED STATES PATENT AND TRADEMARK OFFICE
CERTIFICATE OF CORRECTION

| | | |
|---|---|---|
| PATENT NO. | : 7,472,418 B1 | Page 1 of 1 |
| APPLICATION NO. | : 10/643564 | |
| DATED | : December 30, 2008 | |
| INVENTOR(S) | : Bruce McCorkendale and William E. Sobel | |

It is certified that error appears in the above-identified patent and that said Letters Patent is hereby corrected as shown below:

On the Title page, Item 73, replace "Cuptertino" with --Cupertino--.

Signed and Sealed this

Nineteenth Day of May, 2009

JOHN DOLL
*Acting Director of the United States Patent and Trademark Office*